(12) United States Patent
Ghalayini

(10) Patent No.: US 8,937,118 B2
(45) Date of Patent: Jan. 20, 2015

(54) BUILDING MATERIALS MADE FROM RECYCLED ITEMS

(71) Applicant: Ahmed Maher Ghalayini, Memphis, TN (US)

(72) Inventor: Ahmed Maher Ghalayini, Memphis, TN (US)

( * ) Notice: Subject to any disclaimer, the term of this patent is extended or adjusted under 35 U.S.C. 154(b) by 0 days.

(21) Appl. No.: 13/891,942

(22) Filed: May 10, 2013

(65) Prior Publication Data

US 2014/0336307 A1 Nov. 13, 2014

(51) Int. Cl.
*C04B 28/04* (2006.01)
*C08K 3/00* (2006.01)
*C04B 18/30* (2006.01)

(52) U.S. Cl.
CPC ..................................... *C04B 18/30* (2013.01)
USPC .................................................. 524/8; 524/2

(58) Field of Classification Search
USPC ............................................................ 524/8
See application file for complete search history.

(56) References Cited

U.S. PATENT DOCUMENTS 8,038,790 B1 * 10/2011 Dubey et al. .................. 106/675

* cited by examiner

*Primary Examiner* — Hui Chin
(74) *Attorney, Agent, or Firm* — Wyatt, Tarrant & Combs, LLP; William S. Parks

(57) ABSTRACT

Various building materials constructed from different recycled components are provided. Such materials include boards, bricks, and the like, and exhibit differing levels of tensile strength, heat resistance, and other physical and chemical properties. The capability of introducing varied collected items, including paper, paperboard, clothing fibers, wood chips and strips, raffia bags, used engine oil, etc., and produce a resilient and dimensionally stable building material is presented herein. Replacement of timber and concrete is permitted with such a new material based upon renewable resources. The method of production and use of such materials is encompassed herein as well.

2 Claims, 2 Drawing Sheets

BUILDING MATERIALS MADE FROM RECYCLED ITEMS

FIELD OF THE INVENTION

The present invention is directed to various building materials constructed from different recycled components. Such materials include boards, bricks, and the like, and exhibit differing levels of tensile strength, heat resistance, and other physical and chemical properties. The capability of introducing varied collected items, including paper, paperboard, clothing fibers, wood chips and strips, raffia bags, used engine oil, etc., and produce a resilient and dimensionally stable building material is presented herein. Replacement of timber and concrete is permitted with such a new material based upon renewable resources. The method of production and use of such materials is encompassed herein as well.

BACKGROUND OF THE PRIOR ART

Recycling has become a mainstay of the world as certain resources have been depleted or the costs associated with harvesting and/or utilization thereof continue to rise. Such a process, however, has proven to be taxing on its own as the costs of collection, transportation, separation, and, ultimately, reintroduction into the stream of commerce have also risen, in some situation even outpacing the benefits of a recycling regimen itself. The potential for a cost-effective recycling procedure with diverse renewable products incorporated into single long-term use materials has not, unfortunately, come to fruition in order to not only aid in providing cleaner environments, but also to provide a more efficient method of recycling and producing post-use goods.

Many products have been developed that are either presented in certain form or packaged in a certain manner so as to provide a material that may be used for an amount of time then discarded. For instance, engine oil is generally introduced within a vehicle until its usefulness as a lubricant for pistons therein has run its course. At such a time, then, the used engine oil is typically collected and either incinerated (thus introducing certain undesirable exhaust into the environment) or stored within a landfill or like location for an indefinite period of time. Such oil-based products, however, harbor a potentially harmful environmental result if it spills or leaches into certain land areas, particularly those including a water shed or like natural impediment. Furthermore, polymeric products (which are, for the most part, petroleum byproducts as well) create further problems in that such materials do not readily degrade over time and/or present suspect pollution potential if degradation actually occurs, particularly near water sources. As is well documented, for instance, there exists a garbage mass in the Pacific Ocean full of varied types of plastic materials and of differing sizes thereof that is, currently, estimated to be the size of Texas. The lack of degradation potential leaves such a mass at the mercy of the ocean, possibly creating minute pieces of polymeric particles that can be ingested by the fish population, thus wreaking havoc on the digestive systems of such animals, but also threatening the food chain. Raffia bags (sturdy bags that include polypropylene fibers and that are used to transport and store various solid chemicals, as an example) have proven rather difficult to utilize after as few as a single transport action; such "supersacks" (as they are also known) are susceptible to tearing during rough actions during use. Remedying such issues have proven more troublesome and potentially more expensive than having brand new bags produced and purchased for such purposes. Thus, these types of articles have proven difficult to dispose of properly and thus have also contributed highly to such problems. Millions of such bags of generally provided and used once before discarding. As with most polymeric products, these are also difficult to degrade and take up a great deal of space in landfills and the like.

Paper products, a list of which could last for pages, also contribute significantly to landfills and other like places. Additionally, however, many coated paperboard products are not typically recycled due to the presence of wax coatings on the surface, thus creating an obstacle to the overall process. Even without a wax coating, however, such paperboard products (including cardboard, pizza delivery boxes, moving boxes, etc.) are rather difficult to transport to recycling centers, let alone actually incorporate into recycling processes. The costs to properly break down such products and then reconstitute the same into viable new goods are very high, as well.

Wood products are also of the type that are rarely recycled, particularly since there is a strong timber industry and new wood resources are not in danger. However, the introduction of rather large wood products (furniture, chip board, oriented strand board, etc.) into landfills is rather significant. As a base organic material, such wooden-based goods may degrade over time, certainly, but the sheer size of such items contributes greatly to landfill space and, for lack of a better word, ultimately goes to waste, rather than for a post-consumer market. The ability to utilize components of such large materials within a recycling system of any sort has been limited to, for instance, sculpture or like artistic endeavors utilizing discarded wooden parts. Otherwise, there is lacking a definitive end use beyond the life of, for instance, a furniture piece or like article. Furthermore, certain upholstery and/or clothing includes fibers and fabrics that may be utilized, at least in theory, for other purposes, particularly such fabrics that are attached to discarded furniture. In any event, such materials are also typically not recycled once their usefulness as a garment, cover, curtain, etc., has ended. Landfills, and other like locations, thus exhibit rather significant amounts of natural fibers, such as cotton, jute, etc., as well as synthetic types, such as nylon, polyester, etc., yarns and fibers (not to mention, again, fabrics of all such fibers, both as single fiber types and blends thereof) from discarded articles, too. The potential for utilization of discarded wood-based materials and/or fabrics within recycling procedures has not been undertaken, particularly in relation with other types of materials for post-consumer production schemes.

As such, it is evident that the importance of recycling efforts, even with items that are not typically or traditionally associated with such processes and systems, to alleviate large amounts of landfill quantities, for the purpose of providing cost-effective materials of any sort, has yet to be provided.

ADVANTAGES AND DESCRIPTION OF THE INVENTION

A distinct advantage of the inventive methods and materials is the capability of combining various refuse items into structurally sound articles that can be utilized in a variety of uses. Another distinct advantage is the utilization of potentially environmentally harmful items within new solid articles that would not allow any appreciable migration or loss of harmful chemicals and the like subsequent to article formation. Yet another advantage of this inventive method is the simple manner of collecting and combining such recyclable materials and the introduction thereof within a suitable mold for article production. Still another advantage of this inventive system is the ability to modify the physical characteristics of such materials while still utilizing the same basic recyclable materials for such a purpose. And yet another advantage of this inventive system and materials is the ability to manufacture any shaped block (or other article) to provide a structurally sound portion of an edifice or other end use.

Accordingly, the invention encompasses a solid load-bearing article provided in a three-dimensional geometric shape, said article including at least some content of each of the following recyclable materials: paper, paperboard, clothing fibers, wood chips, wood strips, polypropylene fibers, and used engine and/or cooking oil; wherein said article further includes other components including perlite, pozzolan, calcium hydroxide, and Portland Cement. Furthermore, the invention also encompasses the method of producing such an article including the steps of: 1) producing an initial fiber/paper-based component comprising the steps of a) providing shredded fiber, paper, and paperboard materials, b) mixing said materials to generate a pulp formulation, and c) mixing the pulp formulation with calcium hydroxide to form the fiber paper-based component; 2) producing an initial hydrophobic wood-based component comprising the steps of a) providing ground wood stick materials exhibiting a size from ½ to 1 inch in length and b) coating the wood materials with used engine and/or cooking oil, thereby producing the wood-based component; 3) producing a polymer-based fiber component comprising the steps of a) providing polypropylene raffia bags, and b) shredding the bags through a screen device to produce polypropylene fibers having an average length of from 1 to 3 inches, thereby providing the polymer-based fiber component; 4) mixing the paper-based component, wood-based component, and polymer-based fiber component together with a component selected from perlite, pozzolan, Portland Cement, and any combination thereof, with water within a device to provide a substantially homogeneous liquefied composition; 5) introducing the liquefied composition within a three-dimensional mold for at least 12 hours; 6) curing the board within the mold at a temperature of at least 200° C. for at least 30 minutes; and 7) allowing the resultant cured board to cool to room temperature. A building or other like edifice including at least one of such inventive block materials is encompassed within this invention as well. Additionally, if desired, the resultant block materials may be coated with hydrophobic polymers (such as liquids or films) that impart a moisture blocking property thereto.

The inventive board, block, or other type of structural component made in this manner exhibits excellent strength, resiliency, hydrophobicity, and other desired properties for such a structural purpose. After curing and cooling, the resultant article is surprisingly resilient, particularly as it includes a large amount of the aforementioned recyclable materials rather than, for instance, homogenous brick, stone, or other like components, even to the degree that a user may utilize a saw or other implement to provide any desired size or shape through a clean cut. Typically, with certain materials made from fibers and particulate matter (for example, gypsum board), such materials may be cut, but, unfortunately, the potential for a nonuniform cut is prevalent, not to mention the capacity for undesirable introduction of particulate matter into the surrounding environment. As it is, the inventive articles provide a low-cost alternative to standard building materials, all while simultaneously preventing introduction of waste materials into the environment.

Of further interest and surprise was the capability of such inventive articles to provide conduction and heat exchange resistance, as well as low levels of flammability (i.e., high fire retardancy). Thus, as an insulating product, such materials, dependent, at least to a certain degree, upon the widths thereof, provide further benefits as an interior or exterior building component. Additionally, though, such inventive materials allow for suitable nail and screw introduction without any reduction in structural strength, thus permitting not only effective connection with other materials, but also the reliable to permit a user to hang or display objects from such materials if utilized in such a manner. With a smooth hydrophobic surface, as well, adhesives (such as typical building material glues and the like) may be utilized to conjoin such materials together or to other surfaces, thus permitting a variety of methods of attachment in reliable fashion. Likewise, with such surface properties, a user may easily coat or paint the inventive articles as desired with great reliability in sustenance of such applied colors.

The facilitation of production and cutting, combined with the ease with which attachment with adjacent boards, blocks, etc., further allows a user the capability to repair such articles as needed. If a portion of an inventive article becomes damaged in some manner, the user can easily remove the affected portion and insert a similarly shaped replacement. Thus, repairs with other materials utilizing the same recyclable starting materials is possible. The molding process itself is rather straightforward; with the inclusion and introduction of a homogeneous mixture of the three primary components (as noted above and detailed below) in liquefied form (i.e., having a viscosity at standard temperature and pressure of at most 30,000 pascals, as one possible result) permits easy manufacture through the utilization of any mold shape as needed for either a specific replacement article or any shaped starting material on demand.

Importantly, as well, is with the utilization of such materials, particularly with oil-coated wood components, and integrated fiber/paper products, the surface of the resultant boards, sheets, etc., the resultant articles are not readily susceptible to fungal, insect, or rodent infestation. The hydrophobic qualities imparted to the inventive articles reduce the propensity for any fungal growth as the surface will primarily include a cement-like exterior that does not typically provide a proper attachment point for fungal organisms, nor a nutrient source that would compound the difficulties therewith. As well, without any direct entry for rodent or insect movement, let alone any noticeable external exposure of wood and/or paper components present therein, the cement surface thus further prevents any availability of such potential attractive sources for pests to feed or otherwise attack. The further and aforementioned hydrophobic nature of the inventive article surface prevents water penetration that could compromise the structural integrity of the inventive materials as well. In combination, then, surprisingly, the inventive manufacturing method imparts multiple levels of protection and performance capability for such articles that makes the utilization of recyclable and typically undesirable and potentially environmentally harmful materials worthwhile. Additionally, the manufacturer may accord any degree of density to the inventive materials based upon proper selection of different amounts of each of the three primary components. As such, not only may the overall weight of the inventive articles be dialed to any desired level (without any loss in hydrophobicity, insect and rodent control, etc.) during the manufacturing process, but the manufacturer may also dictate a desired sound insulation characteristic for each produced article, not to mention the capability to produce articles that exhibit different buoyancy levels, further expanding the potential usefulness of the inventive process, certainly, but also the different potential end uses for such inventive articles, too.

The three primary components, as noted above, include different types of recyclable materials. One group (although it may be described as the "first" or "initial," in actuality such a group may be generated in relation to the overall production scheme at any time prior to incorporation within the mixture to be introduced within the mold) includes clothing fiber, paper, and paperboard products. Although such materials may be provided as new materials (i.e., manufactured strictly for inclusion within the inventive method and thus articles described herein), for purposes of providing an effective "green" technology, such materials are preferably those that are reclaimed or presented as used materials and thus utilized in a manner that provides an alternative to landfill placement, destruction (such as burning, etc.), or other action that allows for environmental introduction rather than controlled utilization. Thus, any source of clothing fibers (which may actually include any type of natural fibers from any source, including cotton, rayon, silk, jute, and the like, from clothing, sacks, tablecloths, curtains, sails, etc.), paper or paperboard, including, without limitation, newspapers, cardboard boxes, typing or printing paper, milk cartons, pizza boxes, paper towels, basically anything that utilizes cellulose-based pulp products (i.e., again, paper, cardboard, paperboard, and the like), may serve as a base constituent of such a first group of recyclable materials. Any amount of such materials may be combined together with water and calcium hydroxide (i.e., lime) to form a pulp mixture. For this purpose, the amount of fiber/paper/paperboard products should be from 10-50% of the amount of the water utilized and the calcium hydroxide may be introduced in an amount of 1-10% by weight of the entire fiber/paper/paperboard component and water formulation. Preferably the fiber/paper/paperboard component is present in an amount of from 25-35% of the water, most preferably about 30-35% by weight. The calcium hydroxide is added in an amount preferably about 2-8% of the water/fiber/paper/paperboard amount, most preferably from about 3-6% by weight. Prior to admixing with the water and calcium hydroxide, the fiber/paper/paperboard constituent is first shredded (such as with a shredding device) such that the resultant materials are roughly circular in shape with an average diameter of from 0.5 to 2.0 inches. The calcium hydroxide component is preferably a particulate composition exhibiting a high degree of admixing capability, thus having a sufficiently small size (from 10 to 50 microns, for instance, on average), and a certain degree of hydration to effectuate the desired level of incorporation within the aqueous pulp formulation with the fiber/paper/paperboard constituents. Such a particulate thus effectively coats the paper constituents and allows for an emulsion-like pulp to form allowing for subsequent transfer and introduction with the other two primary components. The resultant combination of water, calcium hydroxide, and sufficiently shredded fiber/paper/paperboard is then introduced together within a large mixer (of any type, particularly of industrial size), to undertake the necessary pulp formation. The mixer speed may be set to any level that allows for such formation to occur, although, for efficiency purposes, such a speed is preferably relatively high. The resultant pulp should appear substantially homogeneous (although differing colorations in discrete regions thereof may be present in relation to the different paper colors that may be present) and should also exhibit a suitable viscosity to allow for further processing, as noted above.

The second component (again, used here solely to denote different components, not as a required process step through such a designation) includes wood constituents, including timber wood (of any type tree source, including pine, oak, poplar, ash, and the like, without limitation) that, as for the paper/paperboard component, may be supplied for this purpose or is reclaimed from a previous use (i.e., recycled or recyclable, as such a term is used interchangeable herein for all the different components). Such a wood constituent may thus be provided as the remnants of a building project (such as extra pieces that have been cut from larger ones and not utilized for a specific purpose, and may not be suitable for any other building project as a result), or from the destruction of another edifice of some type, or any other situation in which remnants or removed wood materials are present, as well as from discarded pieces of furniture, and the like. Such timber wood may thus be in board form, plywood form, oriented strand board form, plank form, or removed from furniture pieces (such as tables, chairs, dressers, beds, and the like), including laminated or non-laminated types. Such wood-based articles may take up a large amount of landfill space or may ultimately be incinerated to provide an effective manner of disposal. As such, the capability of utilizing such materials in a recyclable manner is not only quite useful, but, considering that there are scant few recycled items including such timber wood materials (as described above), such a manner of use is highly surprising. In terms of this second component, then, the wood constituents are first collected and ground into small chips and/or strips in order to allow for effective admixing with the other two components. Such a grinding step thus requires a suitable device to take any size and shape wood item and reducing it to very small strips exhibiting an average length of from about 0.5 to 1 inch (and thus a very thin width of $3/16$ to $1/8$ inch, on average).

The other constituent of this second primary component is reclaimed and used oil, such as engine oil or cooking oil. This oil constituent is any type that would be considered either a petroleum byproduct for proper vehicle lubrication (such as within an engine to allow for effective piston repetition) or a similarly saturated hydrocarbon that has been utilized in vat fryers, and the like, in restaurants. In either case, such oil types are typically collected once removed from vehicles or fryers and require disposal of some sort. As above, environmental introduction is not only undesirable, but is considered illegal in most jurisdictions and many countries. The environmental impact on surface and underground water through motor oil contamination has become a significant problem that requires compliance in terms of effective disposal, leaving very few ways of ultimate handling in that respect. Incineration has been utilized, although the introduction of pollutants within the air from such hydrocarbons is undesirable for the same reasons as for straightforward landfill or water introduction. With used cooking oil, pouring into the sewer system can result in very damaging clogging either within the restaurant location (even within the plumbing system of a person's home) or within the nearby system for a number of different places. Incineration is also frowned upon as, again, hydrocarbons produce noxious fumes and results that pollute the air. Additionally, with any such oil constituent, the actual temperature required for such an incineration step is very high, thus effectively requiring more energy for such an action than would make such an activity beneficial; such inefficiencies thus leave little room for disposal other than finding a suitable recyclable purpose. As such, other than reconstituting such motor oil (which has been done, but at great cost, and with few consumers seeking such products as a result) or cleaning and reusing used cooking oil (which, again, comes at great cost and, after time and repeated usage, such oil is highly susceptible to degradation and fouling, thus leaving further use highly suspect), there are very few recycling actions available.

In this instance, however, it was found that utilizing such used oil constituents provides an effective means to treat the wood constituents prior to mixing with the other components and imparting a hydrophobic coating to the treated wood constituents as a result. This hydrophobicity step allows for the wood constituents to remain the same basic size during mixing with the other components (typically, such cellulosic components would effectively take up water, particularly when in a ground state, thereby absorbing water to an undesirable level during manufacture), as well as impart an effective hydrophobic characteristic to the overall finished structure. Such a level, however, does not mean that the overall final article structure does not take in water (most building materials do, of course), but that the overall structure may easily dry out after any appreciable moisture exposure has occurred.

As it is, the oil constituent is thus applied to the surface of the ground wood constituent in any suitable manner, including spraying, immersion, spreading, and the like (spraying is potentially preferred, due to control and efficiencies reasons), such that the entirety of the wood constituents is properly coated with the oil constituent prior to mixing with the other primary components and introduction within the article mold. The amount of oil applied should be sufficient for complete coating of the wood constituents with a minimum thickness of about 0.01 to about 0.1 mm. Any reclaimed oil of any grade motor oil (for automobiles, trucks, boat engines, lawnmower engines, bus engines, etc.) may be utilized; as well, any type of cooking oil (whether peanut, olive, rapeseed, sesame, etc., types) may be employed within this inventive method for thus purpose.

The third primary component (again, third denotes nothing beyond a manner of differentiating the types of components, not as a required step in terms of time) is a polymer fiber constituent, preferably sturdy polypropylene fibers. Raffia bags are those types that are typically utilized for the transport of large amounts of powdered, granular, or other like solid chemical materials. Such bags are very strong and dimensionally stable thereby providing the necessary rigidity to stand and retain such heavy materials during storage, transport, and other uses. Such bags are typically used only a few times (primarily once) due to the susceptible to tearing, etc., and the costs associated with repair as well as the lack of reliability upon an initial dimensional stability deficiency of such type. Thus, many such bags are utilized but a single time and then discarded for landfill placement. These polymer-based materials (again, primarily polypropylene in nature) are typically woven structure of very strong fibers that may be properly shredded to obtain individual fibers of certain short lengths. As such, the ability to incorporate such polymer-based items within a recyclable manufacturing scheme is desirable, certainly. Finding a way to do so has not proven so easy, however. As such, surprisingly, the utilization of the raffia types for this purpose provides an effective manner of removing such one-use items from the environment.

This third component thus basically requires taking any amount of reclaimed raffia bags and properly shredding them to suitable fiber sizes for introduction within the three-component mixture prior to molding. The shredding device may be the same as used for the paper/paperboard constituents of the first component, as one example. Any typical shredding device of this nature may be utilized for such a purpose, however. The fibers are preferably from about 1 to 3 inches in length (with, again, very low diameters) and provide great dimensional stability to the finished construction block articles due to their fiber strengths. These polymer-based fiber constituents thus provide strength and stability in combination with the other recycled components when introduced in solid, shredded form.

At that point, all three components are then introduced within a suitable large mixer. Also added are perlite, Portland Cement, and/or pozzolan (pozzolan to a lesser extent, but still a possible additive), and, if desired, other additives (including, for instance, surfactants, adhesion promoters, water and fire retardants, and other types of compounds that impart properties to the individual components and/or the overall finished structure). A large amount of water is also added to allow for a proper viscosity for mixing to commence without harming the device itself. The other components and additives are preferably added in an amount of from about 1-10% of the entire three-component mixture by weight (prior to further water addition). Once the initial three-component/other additives mixture is provided, then the extra water is introduced to allow for the proper viscosity levels. Generally, the water is added in an amount of from 10-30% by weight of the three-component mixture. The mixer is then activated and the entire mixture is allowed to homogenize as best it can (again, colors and larger chips/particulates/shredded paper/shredded plastic, etc., may be present in discrete areas of the mixed components) in order to allow for a generally uniform placement of the mixture through a mold such that most of the areas therein will include the same general amount of the constituents introduced therein for curing.

Further components may be included within the formulation prior to mold introduction, particularly other materials that may be removed from the environment and thus provide further recyclable characteristics to the overall inventive articles. Thus, components such as polystyrene foam, polyurethane foam, and other like materials may be added in shredded form to provide different benefits.

The mold may, as noted above, be of any shape and size as long as the introduced three-component, etc., mixture fills the mold to the top and such may be covered. Thus, a standard solid sheet mold, brick mold, two-by-four mold, and the like, again, basically anything, including circular, triangular, spherical, etc., shapes (three-dimensional in nature) may be utilized for such a purpose. A typical mold may be 10 feet in length, 2 feet wide, and about 1.5 inches thick, to form a structurally sound board for construction purposes, as one non-limiting example.

Of some importance is the need to provide a manner to aid in removing air from the mixture when present within the mold. Prior to curing, then, it may be useful to employ, as one example, a vibration procedure to properly drive air bubbles from the mixture to the surface and into the atmosphere. This allows for a dense core to be produced without any trapped air pockets, thereby allowing for greater uniform strength and density throughout the resultant structure, as well.

Subsequent to such a step, then, the mold is placed within a suitable heat source for curing. Any type of kiln, oven, autoclave, and the like, may be employed for such a purpose as long as the mold fits properly therein and a generally even cure is provided over the entirety of the mixture. A higher temperature (in excess of 200° C.) allows for a quick cure and thus a desirable smooth outer surface for the inventive articles. The articles made in this manner are suitably light weight and easy maneuvered to desired locations as a result. They are also very sturdy to take on relatively large loads, can be replaced entirely or in parts easily, and may be incorporated into any suitable building project.

DETAILED DESCRIPTION OF THE DRAWINGS AND PREFERRED EMBODIMENTS OF THE INVENTION

Figure 1:
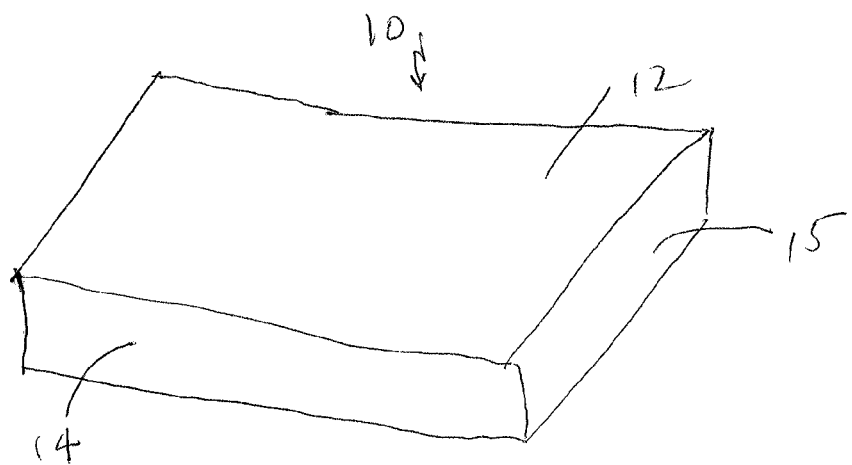
FIG. 1 shows an elevated side view of one potentially preferred block article produced in relation to the invention described herein.

The invention will now be further described with specific examples and drawings that are not intended as limiting the breadth and scope thereof. These examples show the initial production of individual mixture components, as described above, followed by co-mixing with other additives and introduction within molds.

Article Production

The production schemes are as follows:

Example 1

First Component Recyclable Items

Newspaper refuse
Paper Cartons
Cotton yarns and fibers

The recycled items were shredded to a level of an average diameter of 1 inch (2.54 cm) through at most a 2 inch screen. 0.2 pounds of the shredded items were mixed with 10 ounces of calcium hydroxide and 20 pounds of water. The resultant mixture was then thoroughly mixed to form a pulp formulation.

Second Component Recyclable Items (Wood)

Refuse construction pine boards
Refuse oriented strand boards (pine)
Refuse laminated bookcase structure The recycled items were introduced within a chipping device to produce small strands of from about ½ to 1 inch (1.3-2.5 cm) in length (with correspondingly thin widths). 6 pounds of these materials were collected.

Second Component Recyclable Items (Oil)

Refuse Motor Oil (10W30)
Refuse Cooking Oil (Corn-based)

The oil constituents were mixed together and introduced within a sprayer. 3 pounds of the mixture were sprayed over the entirety of the 6 pounds of the wood constituents to provide a complete coating over all individuals strands.

Third Component Recyclable Items 1 pound of collected raffia bags were shredded to produce an average size of polypropylene-based fiber constituents of from 2-3 inches (5-7.5 cm) in length (with correspondingly thin fiber diameters).

Further Additives—

40 pounds of Portland Cement and 2.5 pounds of perlite were introduced within the mixture of the First, Second and Third Components.

Mixture—

The First, Second, and Third Components, as well as the Further Additives were then thoroughly mixed together in a sufficient large vessel. 15 pounds of water were then added to the resultant mixture and the resultant formulation was then mixed further to effectuate homogeneity of all of the Components and Additives and a viscosity sufficient to allow transfer to the mold.

Mold Introduction—

The resultant homogeneous Mixture was then introduced into a mold of dimensions 300 cm×60 cm×3 cm. A vibration device was applied to the exterior of the mold to constantly provide a manner of air bubble movement upward to the surface (with the mold open). After 24 hours of vibration application, the mold was covered and placed within an autoclave for curing at 200° C. for 1 hour. The mold was then removed and allowed to cool for 2 hours at which time the resultant block was removed from the mold and was in condition for utilization as a structural component within a building project.

Example 2

First Component Recyclable Items

Newspaper refuse
Cotton yarns and fibers

The recycled items were shredded to a level of an diameter of about 1 inch (2.5 cm). 0.2 pounds of the shredded items were mixed with 10 ounces of calcium hydroxide and 10 pounds of water. The resultant mixture was then thoroughly mixed to form a pulp formulation.

Second Component Recyclable Items (Wood)

Refuse construction pine boards
Refuse oriented strand boards (pine)
Refuse laminated bookcase structure The recycled items were introduced within a chipping device to produce small strands of an average length of about 0.5-1 inch (1.3-2.5 cm) in length (with correspondingly small widths). 5 pounds of these materials were collected.

Second Component Recyclable Items (Oil)

Refuse Motor Oil (10W30)
Refuse Cooking Oil (Corn-based)

The oil constituents were mixed together and introduced within a sprayer. 2 pounds of the mixture were sprayed over the entirety of the 5 pounds of the wood constituents to provide a complete coating over all individuals strands.

Third Component Recyclable Items 1 pound of collected raffia bags were shredded to produce an average size of polypropylene-based fiber constituents of from about 1 to 3 inches (2.5-7.5 cm) in length (with correspondingly thin fiber diameters).

Further Additives—

40 pounds of Portland Cement and 2 pounds of perlite were introduced within the mixture of the First, Second and Third Components.

Mixture—

The First, Second, and Third Components, as well as the Further Additives were then thoroughly mixed together in a sufficient large vessel. 15 pounds of water were then added to the resultant mixture and the resultant formulation was then mixed further to effectuate homogeneity of all of the Components and Additives and a viscosity sufficient to allow transfer to the mold.

Mold Introduction—

The resultant homogeneous Mixture was then introduced into a mold of dimensions 300 cm×60 cm×3 cm. A vibration device was applied to the exterior of the mold to constantly provide a manner of air bubble movement upward to the surface (with the mold open). After 24 hours of vibration application, the mold was covered and placed within an autoclave for curing at 200° C. for 1 hour. The mold was then removed and allowed to cool for 2 hours at which time the resultant block was removed from the mold and was in condition for utilization as a structural component within a building project.

Figure 2:
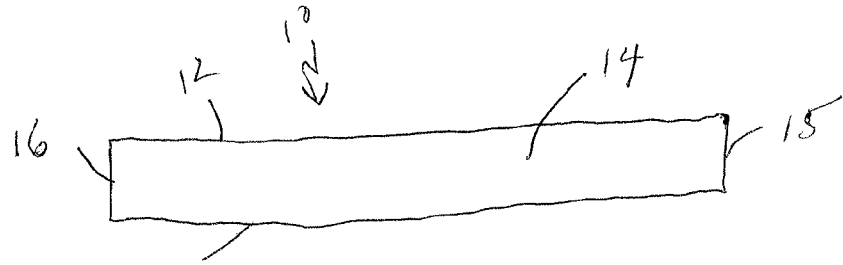
FIG. 2 provides a side view of the same block as in FIG. 1.
Figure 3:
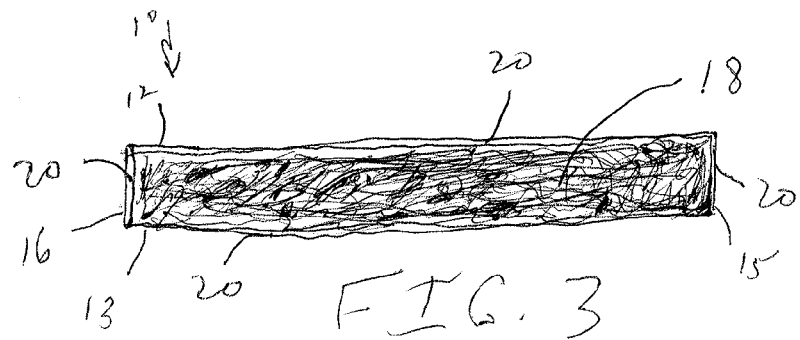
FIG. 3 depicts a cross-sectional view of the block article of FIG. 1.

The resultant boards, such as shown in FIGS. 1, 2, and 3 are sufficiently solid to provide stability as a building material. The block 10 may be provided in any geometric shape (here as a three-dimensional rectangle) and has a top side 12, bottom side (13 in FIG. 2), two lengthwise sides (one 14, the other not illustrated), and two widthwise sides 15, 16 (FIG. 2). Internally, as in FIG. 3, the resultant structure includes a thoroughly distributed core 18 of materials that exhibit excellent strength and adhesion therein. The surface 20 is a substantially smooth coating that imparts a suitable interface with other blocks or, if desired, other materials utilized in a construction environment (not illustrated). In this manner, the resultant block materials are suitable for such construction operations. Further testing of other properties were then undertaken as well.

Figure 4:
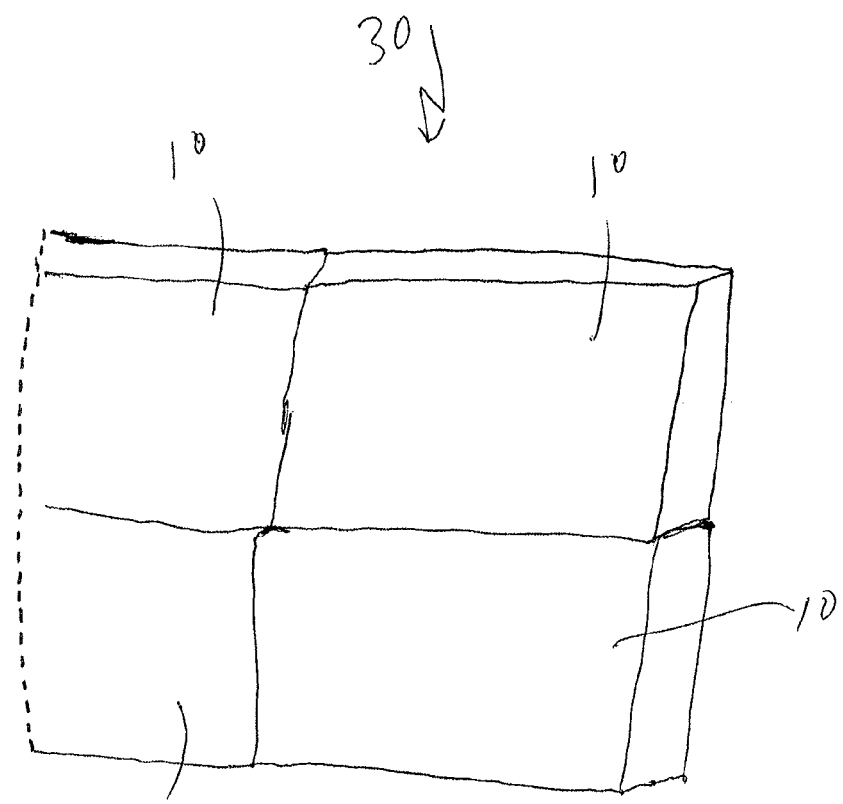
FIG. 4 shows a side view of a representative edifice including a plurality of inventive blocks.

FIG. 4 thus shows an representation of a portion of a edifice 30 including a plurality of such blocks 10 stacked one on top of another. The edifice 30 is of suitable strength to withstand any number of natural weather consequences, as well.

Physical Characteristics

The boards produced above were measured a number of properties. The densities were measured to be 1.1 gm/cm$^3$ and 1.7 gm/cm$^3$, respectively. Both exhibited negligible levels of electrical and heat conduction and were easily sawed into separate pieces without any appreciable damage or unclean cut lines present. Both exhibited ease and reliability for screws and nails introduced therein, as well. The Example 1 board was buoyant due to its density level, while the Example 2 board was not. The surfaces of both were substantially smooth and exhibited effective adhesion to glue and paint, too.

Additionally, the boards were also subjected to tests typical of cement structures to test for cement-like characteristics for water uptake and flexural strength. ASTM Test Protocol C-293/293M was undertaken for flexural strength purposes. Example 1 allowed for a maximum applied load of 30 pounds; Example 2 allowed for 67 pounds. The modulus rupture of Example 1 was measured to be 116 psi and the Example 2 board exhibited the same rupture at 260 psi. Thus, the ability to provide a resilient, strong construction article through the recycled item method described herein, with different structural results as desired, is thus possible.

The water uptake method was ASTM Test C642 and accorded the following results:

TABLE 1

Water Uptake (Dry Weight)

| Example # | Wet Weight (gm) | Dry Weight (gm) | % Absorption |
|---|---|---|---|
| 1 (1$^{st}$ run) | 267.2 | 174.12 | 64.94 |
| 1 (2$^{nd}$ run) | 339.58 | 217.20 | 56.34 |
| 2 (1$^{st}$ run) | 265.83 | 173.30 | 64.93 |
| 2 (2$^{nd}$ run) | 356.89 | 264.50 | 57.30 |

TABLE 2

Water Uptake (additional 5 hr boil)

| Example # | Wet Weight (gm) | Dry Weight (gm) | % Absorption |
|---|---|---|---|
| 1 (1$^{st}$ run) | 306.97 | 174.12 | 76.30 |
| 1 (2$^{nd}$ run) | 365.94 | 217.20 | 68.48 |
| 2 (1$^{st}$ run) | 306.93 | 173.30 | 77.11 |
| 2 (2$^{nd}$ run) | 386.44 | 264.50 | 70.32 |

Thus, in comparison with standard cement formulations, which are typically stronger and exhibit far less water uptake, these recycled item articles provide not only strong, but excellent weatherproof products for construction and cement-like uses and purposes.

Overall, then, these inventive products provide a very effective manner of reducing undesirable waste, particularly certain types that contribute to deleterious environmental impact, and incorporating the same into useful items that can last an indefinite period of time without releasing harmful chemicals and the like.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What I claim is:

1. A solid load-bearing article provided in a three-dimensional geometric shape, said article including at least some content of a first recyclable component including at least one constituent selected from the group consisting of paper, paperboard, and clothing fibers, and any combination thereof; at least some content of a second recyclable component including at least one constituent selected from the group consisting of wood chips and wood strips, and at least one constituent selected from the group consisting of used motor oil, used cooking oil, and a combination thereof; and a third recyclable component including at least some content of polypropylene fibers; wherein said article further includes structural additives selected from the group consisting of perlite, pozzolan, calcium hydroxide, Portland Cement, and any combination thereof.

2. An edifice including at least one of the articles of claim 1.

* * * * *